Patented May 26, 1931

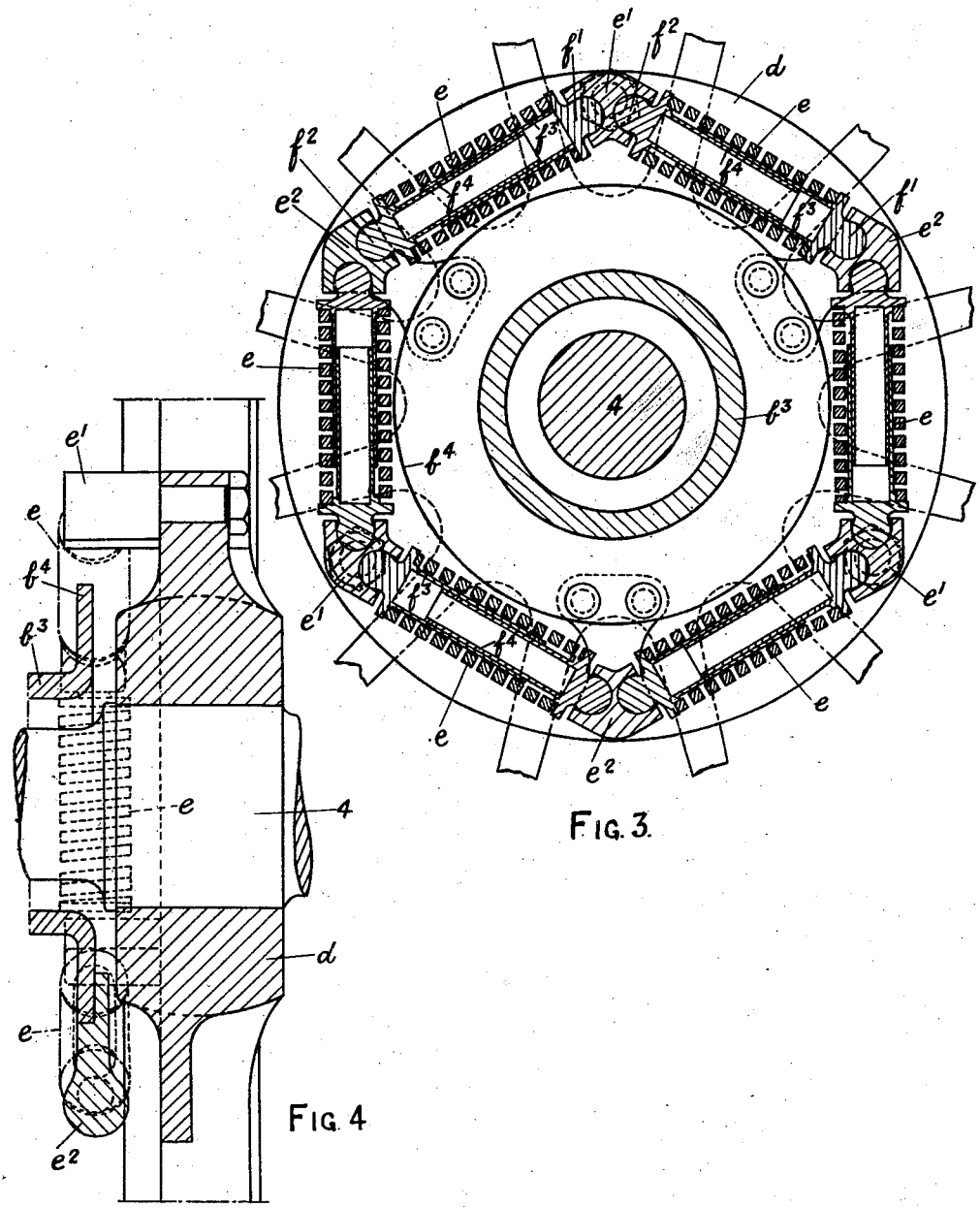

1,807,485

UNITED STATES PATENT OFFICE

JAMES MacLEOD, OF GLASGOW, SCOTLAND

TURBINE DRIVEN LOCOMOTIVE

Application filed June 7, 1930, Serial No. 459,792, and in Great Britain April 29, 1929.

This invention relates to turbine-driven locomotives, having one or more driving axles, in which transmission from the turbines to the driving axles is effected through enclosed rotary gear members and flexible transmission means.

According to the invention there are associated with each driving axle an ahead turbine and a reverse turbine both operatively connected to the respective axle through an enclosed rotary gear train and flexible transmission means, the rotors of both turbines being rigid with a first high-speed pinion of the respective gear train.

Figure 1:
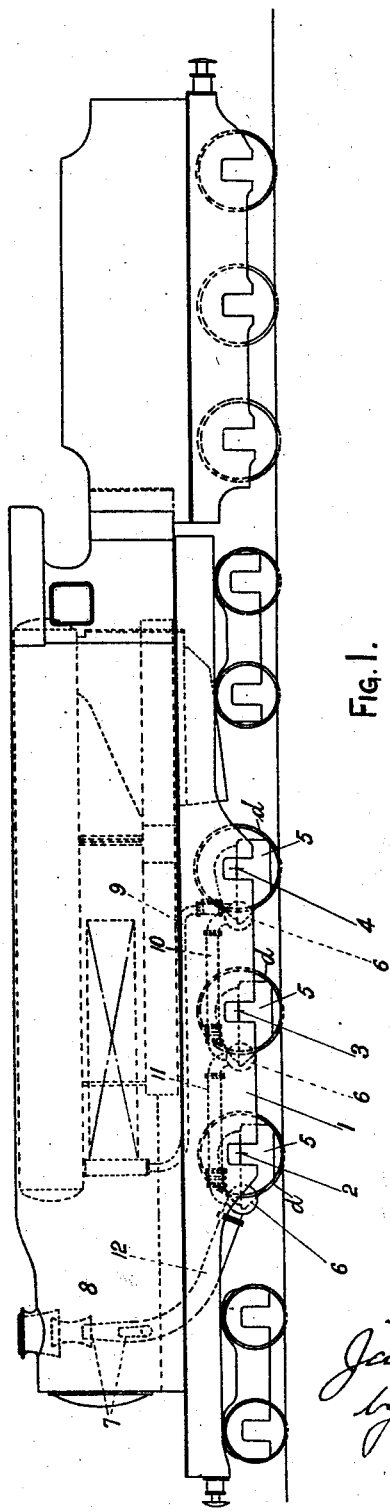
Figure 2:
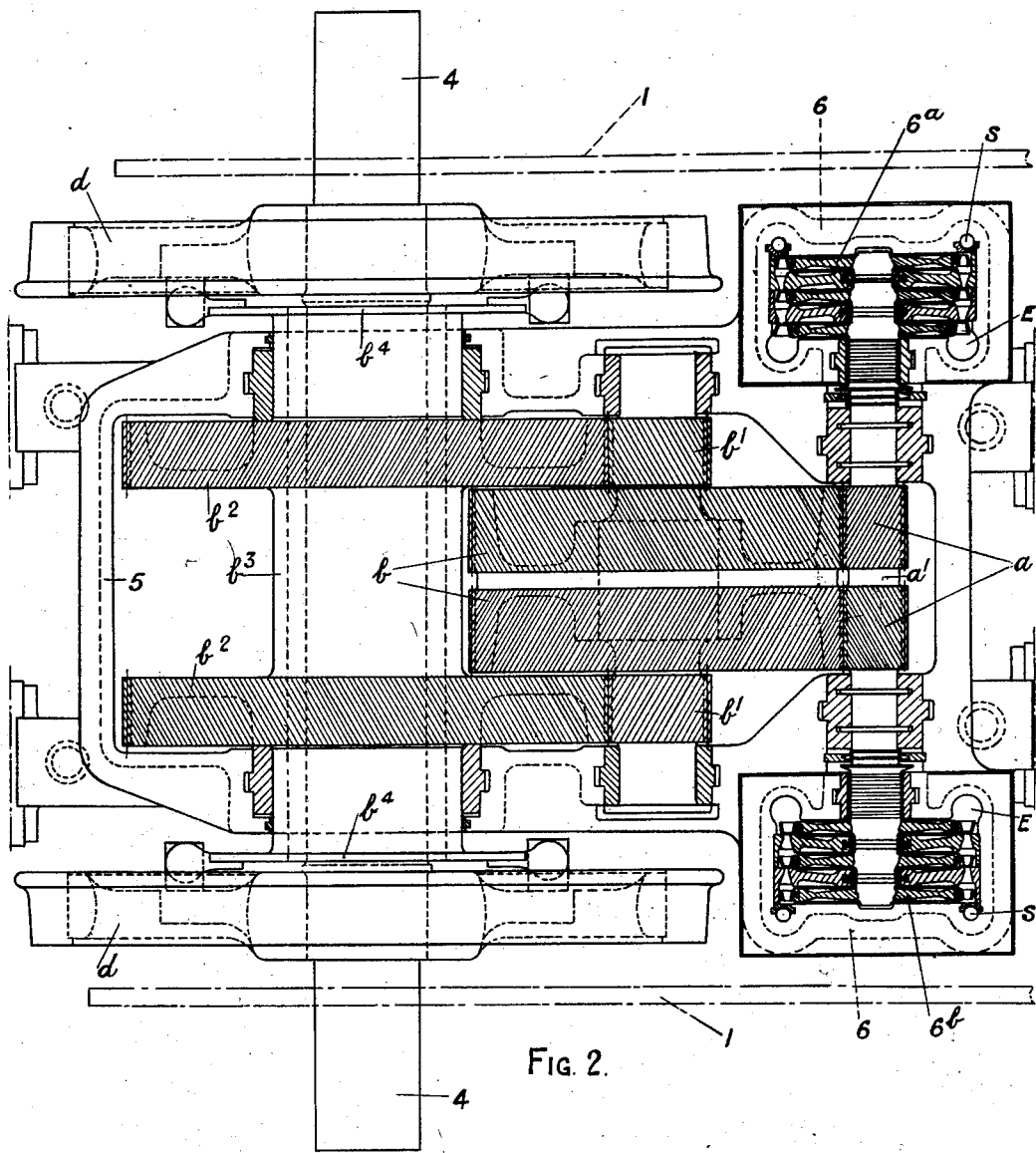

A locomotive constructed in accordance with the invention is illustrated diagrammatically in side elevation in Fig. 1 of the accompanying drawings. Fig. 2 is a plan view of the driving assembly for one axle. Figs. 3 and 4 are detail views of flexible transmission means.

The locomotive shown comprises a wheeled frame 1 having three driving axles 2, 3 and 4. Within the frame 1 is a gear casing 5 for each driving axle containing toothed rotary gear members journalled for rotation on axes disposed athwart the locomotive. Integral with each gear casing 5 are turbine casings 6.

As shown in Fig. 2, discs $6a$ and $6b$ forming, respectively, ahead and reverse turbine rotors may be solid with the overhung ends of a first high speed pinion shaft $a'$ presenting a double-helical pinion $a$ meshing with a double-helical gear wheel $b$ unitary with a double-helical pinion $b'$ which in turn meshes with a double-helical gear wheel $b^2$ integral with a hollow shaft $b^3$ surrounding the driving axle 4 and journalled coaxially therewith in the gear casing 5, the gear ratio of the pinions and gear wheels being such as to effect the required speed reduction.

Fitted between each end of the shaft $b^3$ and the corresponding driving wheel $d$ is flexible transmission means (Figs. 3 and 4) comprising helical compression springs $e$ interposed between abutments presented by telescopically related tubes $f^3$, $f^4$ having, respectively, bulbous ends $f^1$, $f^2$ which enter into ball-and-socket engagement with members $e^1$, carried by the driving wheel $d$ and members $e^2$ secured to a flange $b^4$ unitary with the shaft $b^3$.

S denotes the steam inlet to each turbine and E the exhaust therefrom.

Means is provided for creating a vacuum in the ahead and reverse turbines alternately depending upon the direction of motion of the locomotive. For example, such a vacuum may be created by the ejector action of the exhaust steam from either turbine alternately issuing from exhaust nozzles 7 (Fig. 1) contained within the main exhaust pipe situated in the boiler smoke box 8. The nozzles 7 are adapted to perform the duel function of creating the necessary induced draught for the boiler furnace and fire grate and creating and maintaining the vacuum in the idling turbine or turbines.

As shown in Fig. 1, steam is supplied to the high pressure turbines by way of a valve-controlled pipe 9, and passes from the high pressure ahead and reverse turbines to the intermediate pressure ahead and reverse turbines by way of pipes 10, and from the intermediate turbines to the low pressure ahead and reverse turbines by way of pipes 11, being finally exhausted to the atmosphere by way of pipes 12 connected to the nozzles 7.

The steam and exhaust piping arrangement shown is by way of example only, it being understood that each or any turbine or turbines may be supplied with steam at boiler pressure; that is to say, the turbines may be connected in series, in parallel, or in series parallel arrangement, to the boiler.

I claim:

1. In a locomotive, in combination with a wheeled driving axle, a unitary rotary shaft disposed transversely of the locomotive and having overhung ends, an ahead turbine rotor and a reverse turbine rotor mounted on said overhung ends of said shaft, at least one pinion unitary with said shaft, and a set of rotary gears, and flexible transmission means between said pinion and said axle.

2. In a locomotive, in combination with a wheeled driving axle, a unitary rotary shaft disposed transversely of the locomotive and having overhung ends and disposed parallel to said axle, an ahead turbine rotor and a reverse turbine rotor mounted on said overhung ends of said shaft, a double helical gear pinion unitary with said shaft, flexible transmission means applied to said axle, and speed reducing gear comprising intermeshing double helical gear wheels between said pinion and said flexible transmission means.

In testimony whereof I have signed my name to this specification.

JAMES MacLEOD.